(12) United States Patent
Qi et al.

(10) Patent No.: US 12,380,194 B2
(45) Date of Patent: Aug. 5, 2025

(54) SECURITY AUTHENTICATION METHOD, SYSTEM AND DEVICE FOR IoV COMMUNICATION BASED ON NATIONAL CRYPTOGRAPHIC ALGORITHM

(71) Applicant: NANJING UNIVERSITY OF SCIENCE AND TECHNOLOGY, Jiangsu (CN)

(72) Inventors: Yong Qi, Jiangsu (CN); Mingjun Liu, Jiangsu (CN)

(73) Assignee: NANJING UNIVERSITY OF SCIENCE AND TECHNOLOGY, Jiangsu (CN)

( * ) Notice: Subject to any disclaimer, the term of this patent is extended or adjusted under 35 U.S.C. 154(b) by 0 days.

(21) Appl. No.: 18/579,848

(22) PCT Filed: Feb. 7, 2023

(86) PCT No.: PCT/CN2023/074761
§ 371 (c)(1),
(2) Date: Jan. 16, 2024

(87) PCT Pub. No.: WO2023/147785
PCT Pub. Date: Aug. 10, 2023

(65) Prior Publication Data
US 2024/0241938 A1    Jul. 18, 2024

(30) Foreign Application Priority Data
Feb. 7, 2022    (CN) .......................... 202210116012.5

(51) Int. Cl.
*G06F 21/33*    (2013.01)
*G06F 7/58*    (2006.01)
(Continued)

(52) U.S. Cl.
CPC .............. *G06F 21/33* (2013.01); *G06F 7/588* (2013.01); *G06F 21/45* (2013.01); *G06F 21/602* (2013.01)

(58) Field of Classification Search
CPC .......... G06F 21/33; G06F 7/588; G06F 21/45; G06F 21/602; G06F 21/44; G06F 21/64;
(Continued)

(56) References Cited

U.S. PATENT DOCUMENTS

2010/0287038 A1* 11/2010 Copejans ................ G01S 19/14
                                                                342/357.29
2021/0334353 A1* 10/2021 Peng .................... H04W 12/069
2022/0399998 A1* 12/2022 Lee .......................... H04L 9/40

FOREIGN PATENT DOCUMENTS

CN        103457977 A  * 12/2013
CN        105118098 A  * 12/2015
(Continued)

OTHER PUBLICATIONS

Na Ruan "A novel broadcast authentication protocol for internet of vehicles" Published: Aug. 23, 2016 vol. 10, pp. 1331-1343, (2017), 13 pages (Year: 2017).*

(Continued)

*Primary Examiner* — Shahriar Zarrineh
(74) *Attorney, Agent, or Firm* — DLA Piper LLP (US)

(57) ABSTRACT

The present disclosure provides a security authentication method, system and device for IoV communication based on a national cryptographic algorithm. The method of the present disclosure includes: constructing, by an on-board unit, an identity authentication request message for transmitting to a road side unit; receiving, by the on-board unit, an identity authentication response message, and verifying a signature; and if the verification is successful, calculating, by the on-board unit, a session key and a hash value thereof, and constructing an acknowledgment message for transmit- (Continued)

ting to the road side unit, where the acknowledgment message is used in calculating a session key and a hash value thereof by the road side unit for contrast verification; if hash values are equal, security authentication is successful and a session key is generated; and if the hash values are not equal, the security authentication is failed.

19 Claims, 7 Drawing Sheets

(51) Int. Cl.
*G06F 21/45* (2013.01)
*G06F 21/60* (2013.01)

(58) Field of Classification Search
CPC ..... H04L 9/3247; H04L 2209/84; H04L 9/32; H04L 9/3263; H04L 63/08
See application file for complete search history.

(56) References Cited

FOREIGN PATENT DOCUMENTS

| CN | 105989631 | A | * | 10/2016 | |
| CN | 106027233 | A | * | 10/2016 | ........... H04L 9/0838 |
| CN | 107071774 | A | * | 8/2017 | ........... H04W 12/06 |
| CN | 107182052 | A | * | 9/2017 | ........... H04W 12/06 |
| CN | 108900634 | A | * | 11/2018 | ........... H04W 4/44 |
| CN | 111859314 | A | * | 10/2020 | ........... G06F 21/12 |
| CN | 108650220 | B | * | 12/2020 | ........... H04W 4/40 |
| CN | 112019517 | A | * | 12/2020 | ........... H04L 67/60 |
| CN | 112087419 | A | * | 12/2020 | ........... H04L 63/0876 |
| CN | 112839019 | A | * | 5/2021 | ........... H04W 12/02 |
| CN | 113051621 | A | * | 6/2021 | ........... G06F 21/64 |
| CN | 113852632 | A | * | 12/2021 | ........... H04L 63/061 |
| CN | 113992705 | A | * | 1/2022 | ........... H04L 67/1097 |
| CN | 110677256 | B | * | 8/2022 | ........... H04L 9/3268 |
| CN | 112165386 | B | * | 11/2022 | ........... H04L 9/3263 |
| CN | 115776675 | A | * | 3/2023 | |
| CN | 112785734 | B | * | 7/2023 | ........... G07B 15/063 |
| CN | 113064725 | B | * | 11/2023 | ........... G06F 9/5077 |
| CN | 117858080 | A | * | 4/2024 | ........... H04W 84/18 |
| CN | 113051621 | B | * | 2/2025 | ........... G06F 21/602 |
| DE | 112018002342 | T5 | * | 1/2020 | ........... B60W 50/10 |
| EP | 3879753 | A1 | * | 9/2021 | ........... H04W 12/108 |
| EP | 4451610 | A1 | * | 10/2024 | ........... H04L 9/3263 |
| JP | 2002112337 | A | * | 4/2002 | |
| KR | 20170065172 | A | * | 6/2017 | ........... H04W 12/06 |

OTHER PUBLICATIONS

Palak Bagga "Authentication Protocols in Internet of Vehicles: Taxonomy, Analysis, and Challenges", Published in: IEEE Access ( vol. 8), pp. 54314-54344, Date of Publication: Mar. 17, 2020 (Year: 2020).*

Sriramulu Bojjagani, "Secure Authentication and Key Management Protocol for Deployment of Internet of Vehicles (IoV) Concerning Intelligent Transport Systems"Published in: IEEE Transactions on Intelligent Transportation Systems ( vol. 23, Issue: 12, Dec. 2022), pp. 24698-24713 (Year: 2022).*

* cited by examiner

FIG. 1

| Member | Format |
|---|---|
| Version number | INTEGER |
| Serial number | INTEGER |
| Signature algorithm | OBJECT |
| Issuer | SET |
| Validity period | UTC_TIME |
| Subject | SET |
| Subject public key | BIT_STRING |
| Subject public key algorithm | OBJECT |
| Signature value | BIT_STRING |

SECURITY AUTHENTICATION METHOD, SYSTEM AND DEVICE FOR IoV COMMUNICATION BASED ON NATIONAL CRYPTOGRAPHIC ALGORITHM

This patent application is a national stage application of International Patent Application No. PCT/CN2023/074761, filed Feb. 7, 2023, which claims the benefit and priority of Chinese Patent Application No. 202210116012.5 filed with the China National Intellectual Property Administration on Feb. 7, 2022, and entitled "SECURITY AUTHENTICATION METHOD, SYSTEM AND DEVICE FOR IOV COMMUNICATION BASED ON NATIONAL CRYPTOGRAPHIC ALGORITHM", the disclosures of which are incorporated by reference herein in their entireties as part of the present application.

TECHNICAL FIELD

The present disclosure relates to the technical field of Internet of Vehicles (IoV) security, and in particular, to a security authentication method, system and device for IoV communication based on a national cryptographic algorithm.

BACKGROUND

In the traditional automobile industry, driven by existing computer and communication technologies, communications between vehicles and between a vehicle and a road side unit are realized by means of carried sensor devices and communication devices. However, due to the characteristics of openness and high speed mobility of an IoV communication environment, private information such as the identity of a user and geographical location of a vehicle may be exposed on the IoV. If user information cannot be protected effectively because the user identity is not authenticated legally, IoV communication will give rise to a series of security problems such as user privacy leakage, identity fraud and false information dissemination. Additionally, information nodes such as a vehicle and a road side unit will be under security threats such as replay attack, impersonation attack, message interception, eavesdropping or tampering.

Compared with a traditional Internet of Things, existing IoV identity authentication technologies have the following limitations:

(1) Limited computing and storage resources: most resources in a vehicle are used for vehicle driving, and fewer resources are used for computation and communication.

(2) Professionalized service platform: a vehicle user needs to authenticate information on a plurality of servers to gain diversified experience, and the servers require different identity authentication operations.

(3) Imperfect road site unit: a road side unit node accessible to IoV data is poor in universality, leading to a network delay or wasting of resources.

Based on the above analysis, how to authenticate the validity of the identity of an IoV information node with low computing resource and communication bandwidth is a technical problem needing to be solved currently.

SUMMARY

An objective of the present disclosure is to provide a security authentication method, system and device for IoV communication based on a national cryptographic algorithm to address the problem how to authenticate the validity of the identity of an IoV information node with low computing resource and communication bandwidth.

Specifically, the present disclosure is implemented by the following technical solutions:

In a first aspect, the present disclosure provides a security authentication method for an on-board unit in Internet of Vehicles (IoV) communication based on a national cryptographic algorithm, and the method includes:

constructing, by an on-board unit, an identity authentication request message for transmitting to a road side unit;

receiving, by the on-board unit, an identity authentication response message constructed by the road side unit, and verifying a signature; if the verification is failed, interrupting a request of the on-board unit to connect to the road side unit; and if the verification is successful, calculating, by the on-board unit, a session key and a hash value thereof, and constructing an acknowledgment message for transmitting to the road side unit; where the identity authentication response message is constructed by the road side unit according to the received identity authentication request message and after signature verification is successful;

the acknowledgment message is used in calculating a session key and a hash value thereof by the road side unit for contrast verification; if the hash value of the session key calculated by the road side unit is equal to the hash value of the session key calculated by the on-board unit, security authentication between the on-board unit and the road side unit is successful and a session key is generated; and if the two hash values are not equal, the security authentication between the on-board unit and the road side unit is failed;

a method of constructing, by an on-board unit, an identity authentication request message includes:

generating, by the on-board unit, a temporary serial number SN and a random number $r_A$, encrypting the random number $r_A$ with a public key of the road side unit by using an SM2 public key encryption algorithm to obtain $E_{Pub_B}(r_A)$, signing a hash value $H(r_A)$ of the random number $r_A$ with a private key of the on-board unit by using an SM2 digital signature algorithm to obtain $S_{Pri_A}(H(r_A))$, and combining the temporary serial number SN, an identity identifier $ID_A$, the encrypted random number $E_{Pub_B}(r_A)$ and the signed hash value $S_{Pri_A}(H(r_A))$ into the identity authentication request message $M_{Req}$; the identity authentication request message is calculated by the following formula:

$$M_{Req} = \{SN||ID_A||E_{Pub_B}(r_A)||S_{Pri_A}(H(r_A))\}$$

where || represents a data connector; and a hash algorithm used in calculating the hash value $H(r_A)$ is an SM3 national cryptographic hash algorithm; and a method of the receiving, by the on-board unit, an identity authentication response message constructed by the road side unit, and verifying a signature includes:

receiving, by the on-board unit, the identity authentication response message $M_{Rep}$ from the road side unit, acquiring an identity identifier $ID_B$ of the road side unit, decrypting the encrypted random number $E_{Pub_A}(r_B)$ with the private key of the on-board unit by using the SM2 public key encryption algorithm to obtain the random number $r_A$, and verifying the signed hash value $S_{Pri_A}(H(r_B))$ with the public key of the road side unit by using the SM2 digital signature algorithm.

Further, a method of the calculating, by the on-board unit, a session key and a hash value thereof, and constructing an acknowledgment message includes:

calculating, by the on-board unit, a session key $S_{ka}$ as an exclusive OR value of the random number $r_A$ and a random number $r_B$, calculating a hash value $H(S_{ka})$ of the session key $S_{ka}$, and combining a serial number SN+2, the identity identifier $ID_A$ and the hash value $H(S_{ka})$ of the session key into the acknowledgment message $M_{Ark}$; and the session key and the acknowledgment message are calculated by the following formulas:

$$S_{ka} = r_A \oplus r_B$$

$$M_{Ack} = SN + 2 \| ID_A \| H(S_{ka})$$

where $\oplus$ represents an exclusive OR operation, and $\|$ represents the data connector; and a hash algorithm used in calculating the hash value $H(S_{ka})$ is the SM3 national cryptographic hash algorithm.

Further, before the constructing, by an on-board unit, an identity authentication request message for transmitting to a road side unit, the method further includes:

transmitting, by the on-board unit, a certificate request file to a certificate authority (CA), and receiving a digital certificate generated by the CA signing and issuing the certificate request file from the on-board unit, where the digital certificate includes a public key of the on-board unit and the public key of the road side unit;

the digital certificate signed and issued by the CA to the on-board unit is a CA root certificate in an X.509 format; and information of the digital certificate includes a version number, a serial number, a signature algorithm, an issuer, a validity period, a subject, a subject public key, a subject public key algorithm and a signature value.

In another aspect, the present disclosure provides an IoV on-board unit based on a national cryptographic algorithm, the on-board unit includes a random number generating module, a certificate signing and issuing module, an identity authentication message constructing module and an authentication module, and implementing the above-described security authentication method for an on-board unit in IoV communication based on a national cryptographic algorithm, where the random number generating module is configured to generate a private key by a random number generator in a security chip built in the on-board unit, where the private key is stored in a memory cell of the security chip and prohibited from being exported;

the certificate signing and issuing module is configured to transmit, by the on-board unit, a certificate request file to a CA, and receive a digital certificate generated by the CA signing and issuing the certificate request file from the on-board unit;

the identity authentication message constructing module is configured to construct and transmit an identity authentication request message to a road side unit; and the authentication module is configured to, after receiving an identity authentication response message from the road side unit, verify a signature with a public key of a digital certificate of the road side unit, and calculate a session key and a hash value thereof.

In another aspect, the present disclosure provides a security authentication method for a road side unit in IoV communication based on a national cryptographic algorithm, and the method includes:

receiving, by a road side unit, an identity authentication request message constructed by an on-board unit, and verifying a signature; if the verification is failed, interrupting a request of the on-board unit to connect to the road side unit; and if the verification is successful, constructing, by the road side unit, an identity authentication response message for transmitting to the on-board unit;

receiving, by the road side unit, an acknowledgment message constructed by the on-board unit, and calculating a session key and a hash value thereof for contrast verification with a session key and a hash value thereof calculated by the on-board unit, where if the hash value of the session key calculated by the road side unit is equal to the hash value of the session key calculated by the on-board unit, security authentication between the on-board unit and the road side unit is successful and a session key is generated; and if the two hash values are not equal, the security authentication between the on-board unit and the road side unit is failed;

the acknowledgment message is constructed by the on-board unit after receiving the identity authentication response message and succeeding in verifying the signature, and calculating the session key and the hash value thereof, and transmitted to the road side unit;

a method of the receiving, by a road side unit, an identity authentication request message constructed by an on-board unit, and verifying a signature includes:

receiving, by the road side unit, the identity authentication request message $M_{Req}$ from the on-board unit, acquiring an identity identifier $ID_A$ of the on-board unit, decrypting an encrypted random number $E_{Pub_B}(r_A)$ with a private key of the road side unit by using an SM2 public key encryption algorithm to obtain a random number $r_A$, and verifying a signed hash value $S_{Pri_A}(H(r_A))$ with a public key of the on-board unit by using an SM2 digital signature algorithm;

a method of the constructing, by the road side unit, an identity authentication response message includes:

generating, by the road side unit, a random number $r_B$, encrypting the random number $r_B$ with the public key of the on-board unit by using the SM2 public key encryption algorithm to obtain $E_{Pub_A}(r_B)$, signing a hash value $H(r_B)$ of the random number $r_B$ with the private key of the road side unit by using the SM2 digital signature algorithm to obtain $S_{Pri_B}(H(r_B))$, and combining a serial number SN+1, an identity identifier $ID_B$, the encrypted random number $E_{Pub_A}(r_B)$ and the signed hash value $S_{Pri_B}(H(r_B))$ into the identity authentication response message $M_{Rep}$; and the identity authentication response message is calculated by the following formula:

$$MR_{ep}\{SN+1\|ID_B\|S_{Pub_A}(r_B)\|S_{Pri_B}(H(r_B))\}$$

where $\|$ represents a data connector; and a hash algorithm used in calculating the hash value $H(r_B)$ is an SM3 national cryptographic hash algorithm.

Further, a method of the receiving, by the road side unit, an acknowledgment message, and calculating a session key and a hash value thereof for contrast verification includes:

receiving, by the road side unit, the acknowledgment message $M_{Ark}$, acquiring a hash value $H(S_{ka})$ of a session key, meanwhile, calculating the session key $S_{kb}$ as an exclusive OR value of the random number $r_A$ and the random number $r_B$, and calculating a hash value $H(S_{kb})$ of the session key $S_{kb}$; and comparing $H(S_{kb})$ with $H(S_{ka})$, where if $H(S_{kb})$ is equal to $H(S_{ka})$, security authentication between the on-board unit and the road side unit is successful and a session key is generated: $S_k = S_{ka} = S_{kb}$; and if $H(S_{kb})$ is not equal to $H(S_{ka})$, the security authentication between the on-board unit and the road side unit is failed.

Further, before the receiving, by a road side unit, an identity authentication request message constructed by an on-board unit, the method further includes:

transmitting, by the road side unit, a certificate request file to a CA, and receiving a digital certificate generated by the CA signing and issuing the certificate request file from the road side unit, where the digital certificate includes the public key of the on-board unit and a public key of the road side unit;

the digital certificate signed and issued by the CA to the road side unit is a CA root certificate in an X.509 format; and information of the digital certificate includes a version number, a serial number, a signature algorithm, an issuer, a validity period, a subject, a subject public key, a subject public key algorithm and a signature value.

In another aspect, the present disclosure provides a IoV road side unit based on a national cryptographic algorithm, the road side unit including a random number generating module, a certificate signing and issuing module, an identity authentication message constructing module and an authentication module, and implementing the above-described security authentication method for a road side unit in IoV communication based on a national cryptographic algorithm, where the random number generating module is configured to generate a private key by a random number generator in a security chip built in the road side unit, where the private key is stored in a memory cell of the security chip and prohibited from being exported;

the certificate signing and issuing module is configured to transmit, by the road side unit, a certificate request file to a CA, and receive a digital certificate generated by the CA signing and issuing the certificate request file from the road side unit;

the identity authentication message constructing module is configured to construct and transmit an identity authentication response message to an on-board unit; and the authentication module is configured to, after receiving an acknowledgment message constructed by the on-board unit, verify a signature with a public key of a digital certificate of the on-board unit, and verify a hash value of a session key, where if the verification of the signature or the hash value of the session key is failed, security authentication between the on-board unit and the road side unit is failed.

In another aspect, the present disclosure provides a security authentication system for IoV communication based on a national cryptographic algorithm, and the system includes:

the above on-board unit, the above road side unit, and a CA, where the CA includes a certificate signing and issuing module configured to generate a digital certificate by signing and issuing a certificate request file received from the on-board unit or the road side unit; the digital certificate includes a public key of the on-board unit and a public key of the road side unit; the digital certificate is a CA root certificate in an X.509 format; and information of the digital certificate includes a version number, a serial number, a signature algorithm, an issuer, a validity period, a subject, a subject public key, a subject public key algorithm and a signature value.

In another aspect, the present disclosure provides a security authentication device for IoV communication based on a national cryptographic algorithm, and the device includes a memory and a processor, where the memory stores a computer program for implementing a method for security authentication in IoV communication based on a national cryptographic algorithm, and the processor executes the computer program to implement steps of the above-described method.

According to specific embodiments provided in the present disclosure, the present disclosure has the following technical effects:

The present disclosure is combined with an SM2 digital signature algorithm, an SM2 public key encryption algorithm and an SM3 hash algorithm to perform bidirectional identity authentication for node devices in IoV communication. Under the premise of guaranteeing that an IoV message can be transmitted effectively and safely, the times of complex operation can be reduced, thereby reducing the time complexity and saving internal storage of an on-board unit.

According to the present disclosure, after the completion of bidirectional identity authentication on an on-board unit and a road side server based on a national cryptographic algorithm, session keys can be generated by random number generators and may serve as symmetric keys to encrypt subsequent transmission of an IoV communication message, guaranteeing the confidentiality of subsequent IoV communication data.

According to the present disclosure, identity authentication is performed for each node connection. After the completion of the identity authentication, a new session key may be generated. Due to continuous updating of the session key, an attacker cannot acquire the new session key timely, and the probability that messages cannot be eavesdropped for a long time can be guaranteed effectively.

According to the present disclosure, contrast verification is performed with temporary serial numbers, random numbers and hash values of session keys. If the hash values are different, the user message changes during authentication and cannot pass the authentication. Various security threats such as message replay attack, impersonation attack and man-in-the-middle attack can be effectively prevented.

BRIEF DESCRIPTION OF THE DRAWINGS

To describe the technical solutions in the embodiments of the present disclosure or in the prior art more clearly, the accompanying drawings required in the embodiments will be briefly described below. Apparently, the accompanying drawings in the following description show merely some embodiments of the present disclosure, and other accompanying drawings may be derived from these accompanying drawings by a person of ordinary skill in the art without creative efforts.

DETAILED DESCRIPTION OF THE EMBODIMENTS

The technical solutions in the embodiments of the present disclosure will be clearly and completely described below with reference to the accompanying drawings in the embodiments of the present disclosure. Apparently, the described embodiments are merely a part rather than all of the embodiments of the present disclosure. All other embodiments derived from the embodiments in the present disclosure by a person of ordinary skill in the art without creative efforts shall fall within the protection scope of the present disclosure.

Example 1

Figure 1:
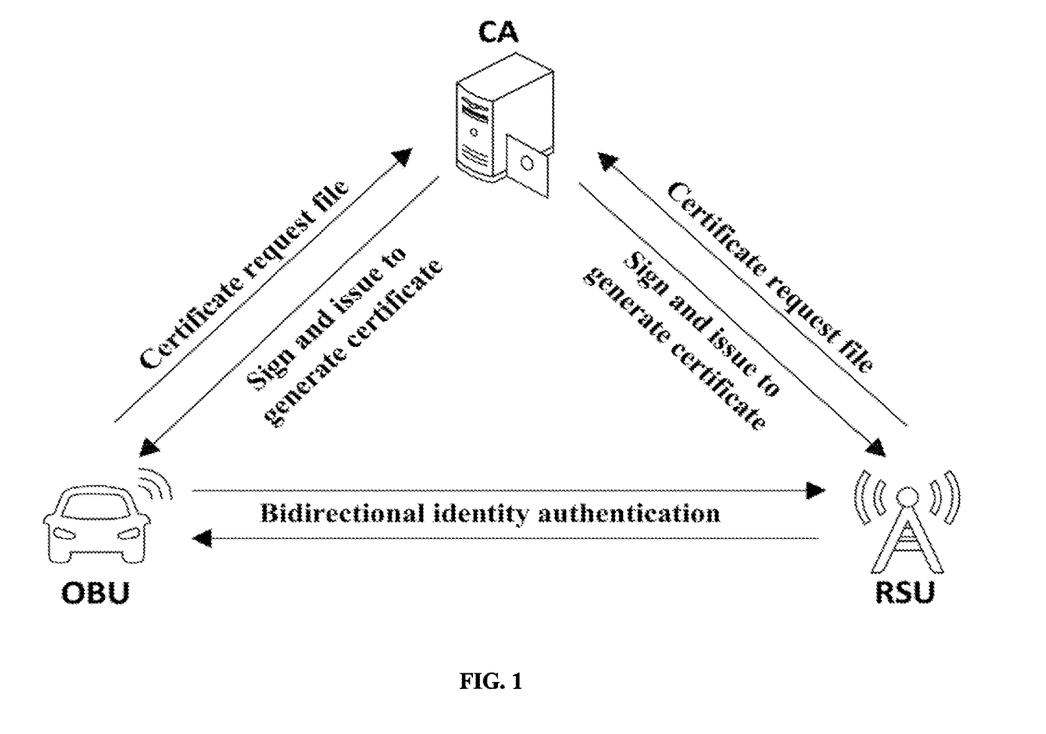
FIG. 1 illustrates a composition and a flowchart of a security authentication system for IoV communication according to the present disclosure.

One example of the present disclosure provides a method for security authentication in IoV communication based on a national cryptographic algorithm. Based on an SM2 digital signature algorithm, an SM2 public key encryption algorithm and an SM3 hash algorithm, bidirectional identity authentication between an on-board unit and a road side unit in an IoV is realized by the on-board unit and the road side unit, as shown in FIG. 1.

Private keys $Pri_A$ and $Pri_B$ are generated by random number generators in security chips built in the on-board unit and the road side unit, respectively, and stored in memory cells of the security chips and prohibited from being exported.

Before the on-board unit and the road side unit perform bidirectional security identity authentication, the on-board unit and the road side unit transmit certificate request files to a CA, respectively, and the CA signs and issues the certificate request files from the on-board unit and the road side unit to generate a digital certificate, respectively. The digital certificate includes a public key of the on-board unit and a public key of the road side unit.

Figure 2:
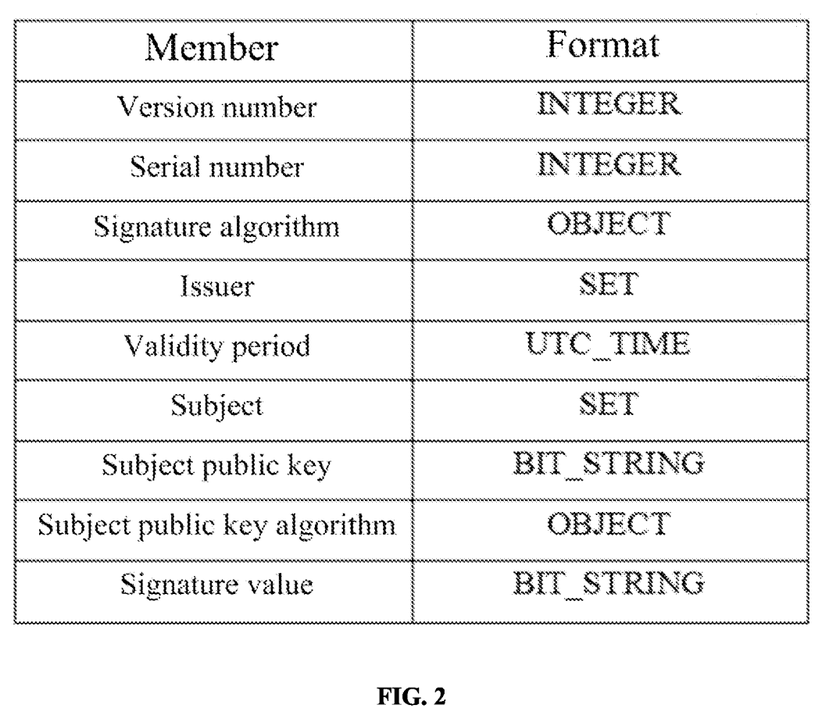
FIG. 2 is a schematic diagram of an information structure of a digital certificate signed and issued by a certificate authority (CA) according to the present disclosure.

The digital certificate is a CA root certificate in an X.509 format, and information of the digital certificate includes a version number, a serial number, a signature algorithm, an issuer, a validity period, a subject, a subject public key, a subject public key algorithm and a signature value, as shown in FIG. 2.

The version number is used for identifying an X.509 standard version of the certificate.

The serial number is assigned to the certificate by an entity issuing the certificate for distinguishing from other certificates issued by the entity.

The signature algorithm is used for identifying an algorithm used by the CA when signing and issuing the certificate.

The issuer is used for identifying an entity signing the certificate and issuing the certificate.

The validity period is used for identifying that the certificate is valid within a limited period of time and represented by the time of a start date and the time of an expiry date of the certificate.

The subject is used for identifying an entity name by which the certificate is capable of recognizing a subject public key, and a name of the subject follows the X.500 standard and is unique in the Internet.

The subject public key is used for identifying public key information of the subject.

The subject public key algorithm is used for identifying a corresponding public key algorithm of the subject.

The signature value is used for identifying digital signature information of the CA to effectively verify the digital certificate is true and false.

Figure 3:
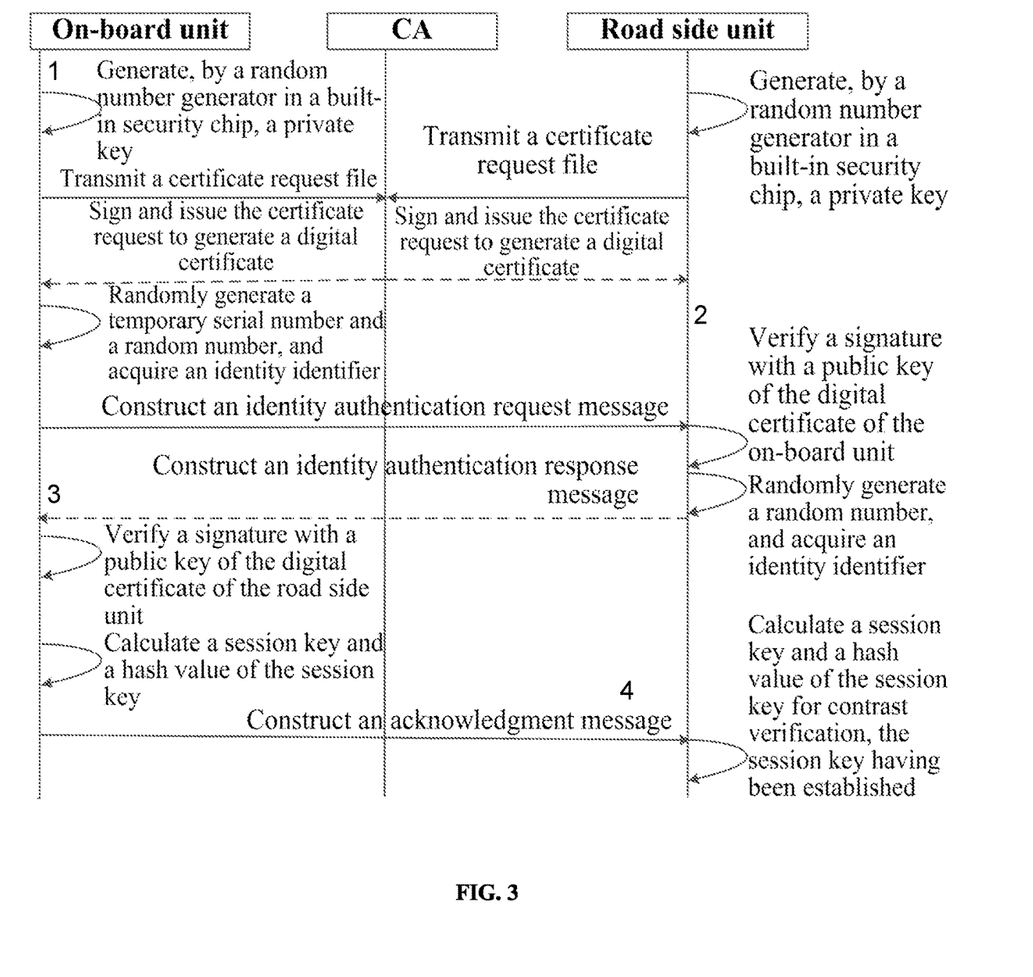
FIG. 3 is a detailed flowchart of security authentication in IoV communication according to the present disclosure.

The method for security authentication in IoV communication based on a national cryptographic algorithm includes a security authentication method for an on-board unit in IoV communication based on a national cryptographic algorithm, which is implemented by the on-board unit, and a security authentication method for a road side unit in IoV communication based on a national cryptographic algorithm, which is implemented by the road side unit. Detailed processes are as shown in FIG. 3. The following steps are included.

1: the on-board unit constructs an identity authentication request message for transmitting to the road side unit.

The on-board unit generates a temporary serial number SN and a random number $r_A$, encrypts the random number $r_A$ with a public key of the road side unit by using an SM2 public key encryption algorithm to obtain $E_{Pub_B}(r_A)$, signs a hash value $H(r_A)$ of the random number $r_A$ with a private key of the on-board unit by using an SM2 digital signature algorithm to obtain $S_{Pri_A}(H(r_A))$, and combines the temporary serial number SN, an identity identifier $ID_A$, the encrypted random number $E_{Pub_B}(r_A)$ and the signed hash value $S_{Pri_A}(H(r_A))$ into the identity authentication request message $M_{Req}$. The identity authentication request message is calculated by the following formula:

$$M_{Req} = \{SN\|ID_A\|E_{Pub_B}(r_A)\|S_{Pri_A}(H(r_A))\}$$

where $\|$ represents a data connector; and a hash algorithm used in calculating the hash value $H(r_A)$ is an SM3 national cryptographic hash algorithm.

2: the road side unit receives the identity authentication request message and verifies a signature; if the verification is failed, a request of the on-board unit to connect to the road side unit is interrupted; and if the verification is successful, the road side unit constructs an identity authentication response message for transmitting to the on-board unit.

Receiving the identity authentication request message and verifying a signature by the road side unit are specifically as follows.

The road side unit receives the identity authentication request message $M_{Req}$ from the on-board unit, acquires an identity identifier $ID_A$ of the on-board unit, decrypts the encrypted random number $E_{Pub_B}(r_A)$ with a private key of the road side unit by using the SM2 public key encryption algorithm to obtain the random number $r_A$, and verifies the signed hash value $S_{Pri_A}(H(r_A))$ with a public key of the on-board unit by using the SM2 digital signature algorithm.

If the verification is successful, the road side unit constructs the identity authentication response message, which is specifically as follows.

The road side unit generates a random number $r_B$, encrypts the random number $r_B$ with the public key of the on-board unit by using the SM2 public key encryption algorithm to obtain $E_{Pub_A}(r_B)$, signs a hash value $H(r_B)$ of the random number $r_B$ with the private key of the road side unit by using the SM2 digital signature algorithm to obtain $S_{Pri_B}(H(r_B))$, and combines a serial number SN+1, an identity identifier $ID_B$, the encrypted random number $E_{Pub_A}(r_B)$ and the signed hash value $S_{Pri_B}(H(r_B))$ into the identity authentication response message $M_{Rep}$. The identity authentication response message is calculated by the following formula:

$$M_{Rep} = \{SN + 1 \| ID_B \| E_{Pub_A}(r_B) \| S_{Pri_B}(H(r_B))\}$$

where $\|$ represents a data connector; and a hash algorithm used in calculating the hash value $H(r_B)$ is an SM3 national cryptographic hash algorithm.

3: the on-board unit receives the identity authentication response message and verifies a signature; if the verification is failed, the request of the on-board unit to connect to the road side unit is interrupted; and if the verification is successful, the on-board unit calculates a session key and a hash value thereof, and constructs an acknowledgment message for transmitting to the road side unit.

Receiving the identity authentication response message and verifying the signature by the on-board unit are specifically as follows.

The on-board unit receives the identity authentication response message $M_{Rep}$ from the road side unit, acquires an identity identifier $ID_B$ of the road side unit, decrypts the encrypted random number $E_{Pub_A}(r_B)$ with the private key of the on-board unit by using the SM2 public key encryption algorithm to obtain the random number $r_A$, and verifies the signed hash value $S_{Pri_B}(H(r_B))$ with the public key of the road side unit by using the SM2 digital signature algorithm.

If the verification is successful, the on-board unit calculates the session key and the hash value thereof, and constructs the acknowledgment message for transmitting to the road side unit, which are specifically as follows.

The on-board unit calculates the session key $S_{ka}$ as an exclusive OR value of the random number $r_A$ and the random number $r_B$, calculates the hash value $H(S_{ka})$ of the session key $S_{ka}$, and combines a serial number SN+2, the identity identifier $ID_A$ and the hash value $H(S_{ka})$ of the session key into the acknowledgment message $M_{Ack}$. The session key and the acknowledgment message are calculated by the following formulas:

$$S_{ka} = r_A \oplus r_B$$

$$M_{Ack} = SN + 2 \| ID_A \| H(S_{ka})$$

where $\oplus$ represents an exclusive OR operation, and $\|$ represents the data connector; and a hash algorithm used in calculating the hash value $H(S_{ka})$ is the SM3 national cryptographic hash algorithm.

4: the road side unit receives the acknowledgment message and calculates a session key and a hash value thereof for contrast verification; if the hash values of the session keys are equal, security authentication between the on-board unit and the road side unit is successful and a session key is generated; and if the two hash values are not equal, the security authentication between the on-board unit and the road side unit is failed. This step is specifically as follows.

The road side unit receives the acknowledgment message $M_{Ack}$, acquires a hash value $H(S_{ka})$ of a session key, meanwhile, calculates the session key $S_{kb}$ as an exclusive OR value of the random number $r_A$ and the random number $r_B$, and calculates a hash value $H(S_{kb})$ of the session key $S_{kb}$. $H(S_{kb})$ is compared with $H(S_{ka})$; if $H(S_{kb})$ is equal to $H(S_{ka})$, the security authentication between the on-board unit and the road side unit is successful and a session key is generated: $S_k = S_{ka} = S_{kb}$; and if $H(S_{kb})$ is not equal to $H(S_{ka})$, the security authentication between the on-board unit and the road side unit is failed.

Figure 4:
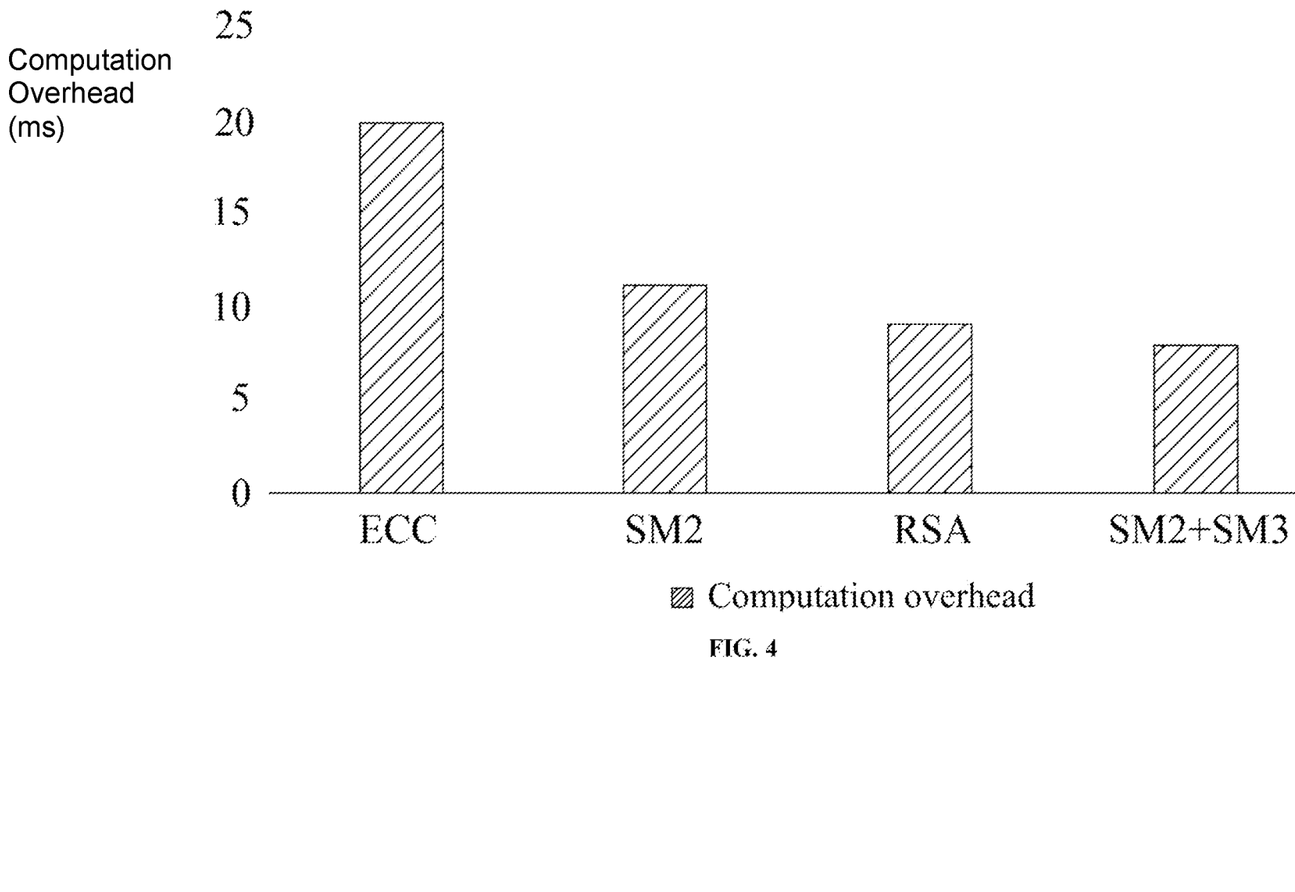
FIG. 4 is a schematic diagram of a computation overhead of bidirectional identity authentication in a method according to the present disclosure.
Figure 5:
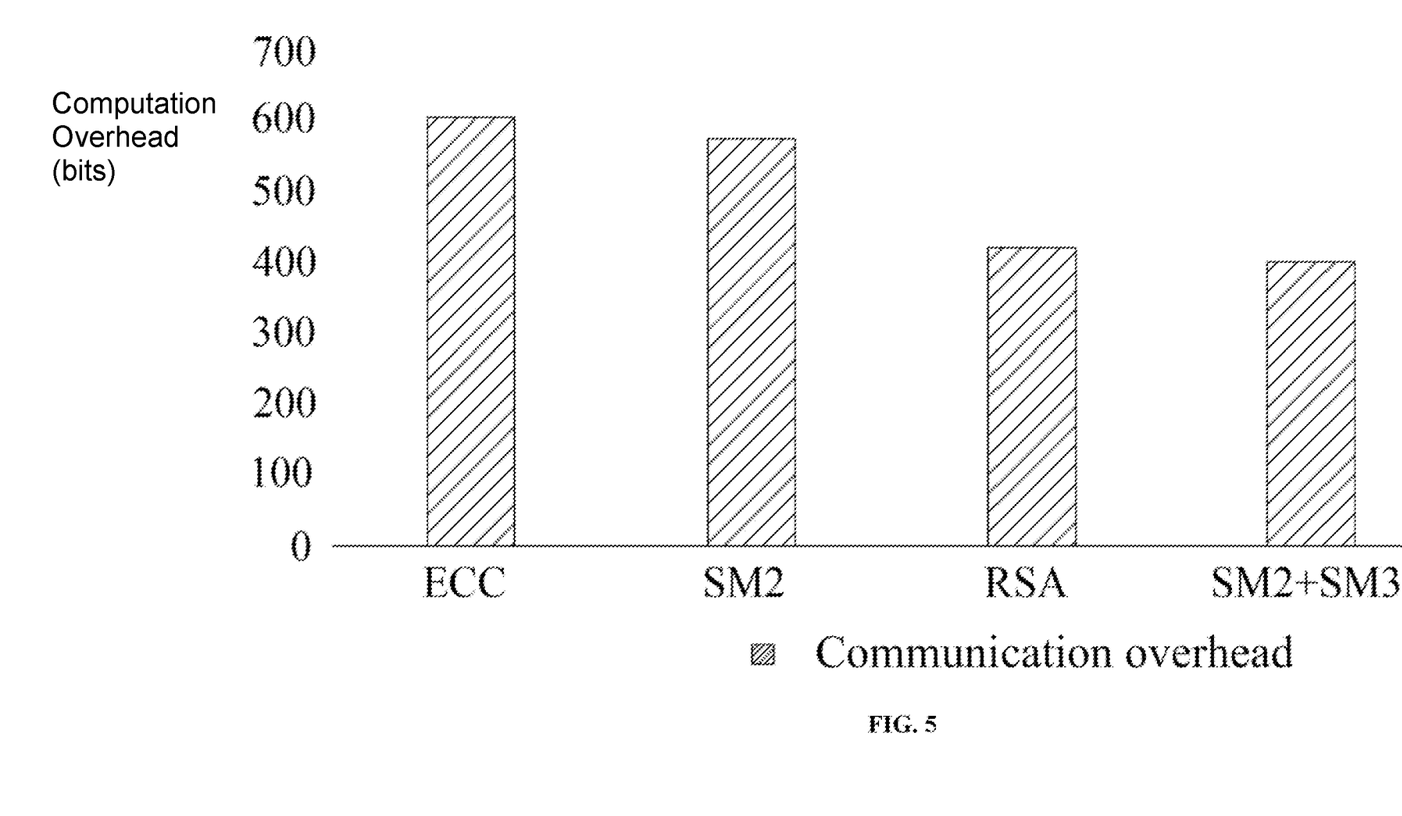
FIG. 5 is a schematic diagram of a communication overhead of bidirectional identity authentication in a method according to the present disclosure.

As used in the present disclosure, an SM2 key has a length of 256 bits; an identity identifier is a hardware code of 8 bytes; and a random number has a length of 16 bytes. As shown in FIG. 4 and FIG. 5, compared with traditional simplex authentication methods based on elliptic curve cryptography (ECC), SM2 key negotiation and RSA algorithm, under the premise of guaranteeing that an IoV message can be transmitted effectively and safely, the times of complex operation can be reduced, thereby reducing the time complexity and saving internal storage of the on-board unit. High-efficiency identity authentication can be realized with low computing resource and communication bandwidth.

After the completion of bidirectional identity authentication on the on-board unit and the road side server based on a national cryptographic algorithm, session keys can be generated by random number generators and may serve as symmetric keys to encrypt subsequent transmission of an IoV communication message, guaranteeing the confidentiality of subsequent IoV communication data. Identity authentication is performed for each node connection. After the completion of the identity authentication, a new session key may be generated. Due to continuous updating of the session key, an attacker cannot acquire the new session key timely, and the probability that messages cannot be eavesdropped for a long time can be guaranteed effectively.

During bidirectional identity authentication, contrast verification is performed with temporary serial numbers, random numbers and hash values of session keys. If the hash values are different, the user message changes during the authentication and cannot pass the authentication. Various security threats such as message replay attack, impersonation attack and man-in-the-middle attack can be effectively prevented.

Example 2

Figure 6:
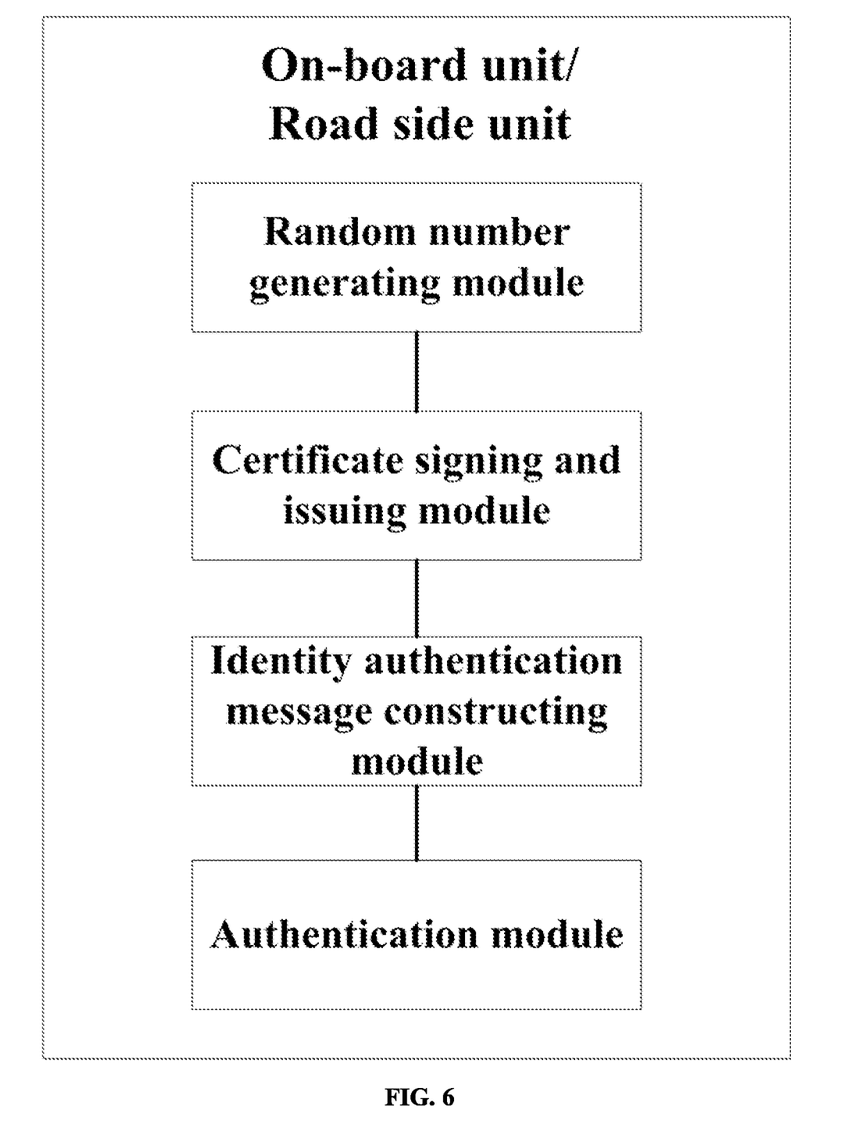
FIG. 6 is a structural schematic diagram of an IoV on-board unit of Example 2 and an IoV road side unit of Example 3.

Another example of the present disclosure provides an IoV on-board unit based on a national cryptographic algorithm, including a random number generating module, a certificate signing and issuing module, an identity authentication message constructing module and an authentication module, as shown in FIG. 6. The on-board unit of this example implements the security authentication method for an on-board unit in IoV communication based on a national cryptographic algorithm as described in Example 1.

The random number generating module is configured to generate a private key by a random number generator in a security chip built in the on-board unit, where the private key is stored in a memory cell of the security chip and prohibited from being exported.

The certificate signing and issuing module is configured to transmit, by the on-board unit, a certificate request file to a CA, and receive a digital certificate generated by the CA signing and issuing the certificate request file from the on-board unit.

The identity authentication message constructing module is configured to construct and transmit an identity authentication request message to a road side unit.

The authentication module is configured to, after receiving an identity authentication response message from the road side unit, verify a signature with a public key of a digital certificate of the road side unit, and calculate a session key and a hash value thereof.

Example 3

Another example of the present disclosure provides a IoV road side unit based on a national cryptographic algorithm, including a random number generating module, a certificate signing and issuing module, an identity authentication message constructing module and an authentication module, as shown in FIG. 6. The road side unit of this example implements the security authentication method for a road side unit in IoV communication based on a national cryptographic algorithm as described in Example 1.

The random number generating module is configured to generate a private key by a random number generator in a security chip built in the road side unit, where the private key is stored in a memory cell of the security chip and prohibited from being exported.

The certificate signing and issuing module is configured to transmit, by the road side unit, a certificate request file to a CA, and receive a digital certificate generated by the CA signing and issuing the certificate request file from the road side unit.

The identity authentication message constructing module is configured to construct and transmit an identity authentication response message to an on-board unit.

The authentication module is configured to, after receiving an acknowledgment message constructed by the on-board unit, verify a signature with a public key of a digital certificate of the on-board unit, and verify a hash value of a session key, where if the verification of the signature or the hash value of the session key is failed, security authentication between the on-board unit and the road side unit is failed.

Example 4

Another example of the present disclosure provides a CA of an IoV based on a national cryptographic algorithm, including a certificate signing and issuing module configured to generate a digital certificate by signing and issuing a certificate request file received from the on-board unit or the road side unit, where the digital certificate includes a public key of the on-board unit and a public key of the road side unit; the digital certificate is a CA root certificate in an X.509 format; and information of the digital certificate includes a version number, a serial number, a signature algorithm, an issuer, a validity period, a subject, a subject public key, a subject public key algorithm and a signature value.

The digital certificate is a CA root certificate in an X.509 format, and information of the digital certificate includes a version number, a serial number, a signature algorithm, an issuer, a validity period, a subject, a subject public key, a subject public key algorithm and a signature value, as shown in FIG. 2.

The version number is used for identifying an X.509 standard version of the certificate.

The serial number is assigned to the certificate by an entity issuing the certificate for distinguishing from other certificates issued by the entity.

The signature algorithm is used for identifying an algorithm used by the CA when signing and issuing the certificate.

The issuer is used for identifying an entity signing the certificate and issuing the certificate.

The validity period is used for identifying that the certificate is valid within a limited period of time and represented by the time of a start date and the time of an expiry date of the certificate.

The subject is used for identifying an entity name by which the certificate is capable of recognizing a subject public key, and a name of the subject follows the X.500 standard and is unique in the Internet.

The subject public key is used for identifying public key information of the subject.

The subject public key algorithm is used for identifying a corresponding public key algorithm of the subject.

The signature value is used for identifying digital signature information of the CA to effectively verify the digital certificate is true and false.

Example 5

Another example of the present disclosure provides a security authentication system for IoV communication based on a national cryptographic algorithm, including:

at least one IoV on-board unit based on a national cryptographic algorithm as described in Example 2, the IoV road side unit based on a national cryptographic algorithm as described in Example 3, and a CA of an IoV based on a national cryptographic algorithm as described in Example 4.

Private keys are generated by random number generators in security chips built in the on-board unit and the road side unit, and stored in memory cells of the security chips and prohibited from being exported.

The on-board unit and the road side unit transmit certificate request files to the CA, and the CA signs and issues the certificate request files from the on-board unit and the road side unit to generate a digital certificate.

The on-board unit constructs an identity authentication request message for transmitting to the road side unit, and the road side unit receives the identity authentication request message and verifies a signature.

The road side unit constructs an identity authentication response message for transmitting to the on-board unit, and the on-board unit receives the identity authentication response message and verifies a signature.

The on-board unit calculates a session key and a hash value thereof, and constructs an acknowledgment message for transmitting to the road side unit, and the road side unit receives the acknowledgment message and calculates a session key and a hash value thereof for contrast verification.

Example 6

Figure 7:
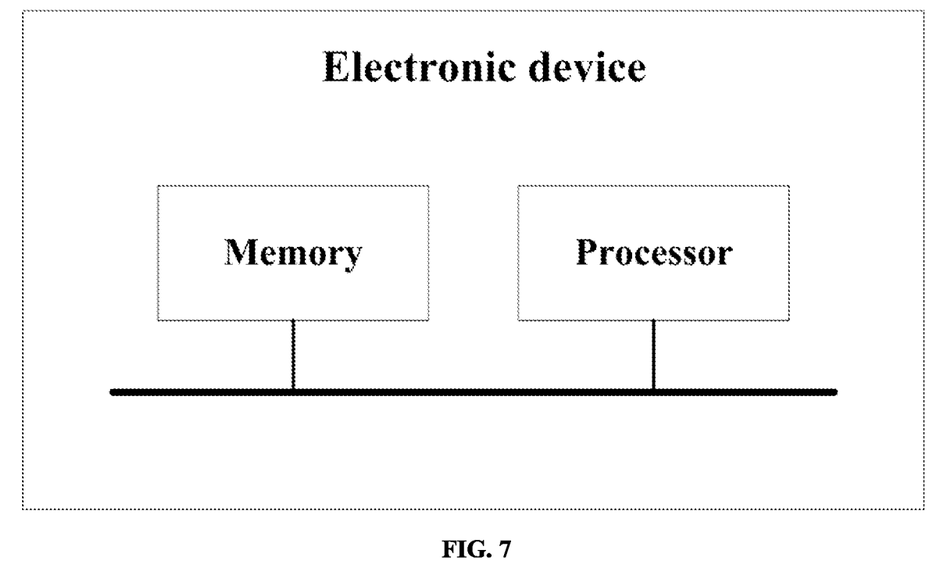
FIG. 7 is a structural schematic diagram of Example 6.

Another example of the present disclosure provides a security authentication device for IoV communication based on a national cryptographic algorithm. The system includes a memory and a processor, as shown in FIG. 7. The memory stores a computer program for implementing a method for security authentication in IoV communication based on a national cryptographic algorithm, and the processor executes the computer program to implement steps of a security authentication method for an on-board unit in IoV communication based on a national cryptographic algorithm or a security authentication method for a road side unit in IoV communication based on a national cryptographic algorithm.

The method, device and security authentication system for IoV communication based on a national cryptographic algorithm in the present disclosure have the following technical effects.

The present disclosure is combined with an SM2 digital signature algorithm, an SM2 public key encryption algorithm and an SM3 hash algorithm to perform bidirectional identity authentication for node devices in IoV communication. Under the premise of guaranteeing that an IoV message can be transmitted effectively and safely, the times of complex operation can be reduced, thereby reducing the time complexity and saving internal storage of an on-board unit.

According to the present disclosure, after the completion of bidirectional identity authentication on an on-board unit and a road side server based on a national cryptographic algorithm, session keys can be generated by random number generators and may serve as symmetric keys to encrypt subsequent transmission of an IoV communication message, guaranteeing the confidentiality of subsequent IoV communication data.

According to the present disclosure, identity authentication is performed for each node connection. After the completion of the identity authentication, a new session key may be generated. Due to continuous updating of the session key, an attacker cannot acquire the new session key timely, and the probability that messages cannot be eavesdropped for a long time can be guaranteed effectively.

According to the present disclosure, contrast verification is performed with temporary serial numbers, random numbers and hash values of session keys. If the hash values are different, the user message changes during authentication and cannot pass the authentication. Various security threats such as message replay attack, impersonation attack and man-in-the-middle attack can be effectively prevented.

In some embodiments, some aspects of the technique described above may be implemented by one or more processors of a processing system executing software. The software includes stores or tangibly implements in other ways one or more executable instruction sets on a non-transient computer readable storage medium. The software may include instructions and some data which, when executed by one or more processors, manipulate the one or more processors to perform one or more aspects of the technique described above. The non-transient computer readable storage medium may include, for example, a magnetic or optical disk storage device, such as solid-state storage devices like a flash memory, a cache, a random access memory (RAM), etc. or other nonvolatile memory devices. Executable instructions stored on the non-transient computer readable storage medium may be source codes, assembly language codes, target codes, or in other instruction formations explained or executed in other ways by one or more processors.

The computer readable storage medium may include any storage medium accessible by a computer system to provided instructions and/or data to the computer systems during use or a combination of storage mediums. Such a storage medium may include but be not limited to an optical medium (e.g., a compact disc (CD), a digital versatile disc (DVD) or a blue-ray disc), a magnetic medium (e.g., a floppy disc, a magnetic tape or a magnetic hard drive), a volatile memory (e.g., a random access memory (RAM) or a cache), a nonvolatile memory (e.g., a read-only memory (ROM) or a flash memory) or a storage medium based on a micro electro mechanical system (MEMS). The computer readable storage medium may be embedded in a computing system (e.g., a system RAM or ROM), fixedly attached to a computing system (e.g., a magnetic hard drive), removably attached to a computing system (e.g., a CD or a flash memory based on a universal serial bus (USB)), or coupled to a computer system via a wired or wireless network (e.g., network accessible storage (NAS)).

It needs to be noted that not all acts or elements in the above general description are essential and a part of a specific act or device may be not essential. Moreover, one or more further acts or included elements may be performed in addition to those described. Still further, the sequence of acts listed is not necessarily the sequence of performing them. Moreover, these concepts have been described with reference to specific embodiments. However, it will be recognized by those of ordinary skill in the art that various alternations and changes may be made without departing from the scope of the present disclosure set forth in the appended claims. Therefore, the description and the accompanying drawings are considered to be illustrative rather than limiting, and all such alternations are included within the scope of the present disclosure.

Benefits, other advantages and solutions to problems have been described above with respect to specific embodiments. However, benefits, advantages and solutions to problems that may cause any benefit, advantage or solution to occur or become more apparent and any feature should not be construed as critical or necessary features for any or other aspects or essential features for any or all claims. Moreover, the specific embodiments described above are merely illustrative because the disclosed subject matter may be modified and implemented in such a manner that is apparently different but equivalent for those skilled in the art who benefit from the teaching herein. In addition to those described in the claims, it is not intended to limit configurations shown herein or designed details. Therefore, it is obvious that the specific embodiments disclosed above may be changed or alternated and all such changes are considered to be within the scope of the disclosed subject matter.

What is claimed is:

1. A security authentication method for an on-board unit in Internet of Vehicles (IoV) communication based on a national cryptographic algorithm, the method comprising:
   constructing, by an on-board unit, an identity authentication request message for transmitting to a road side unit;
   receiving, by the on-board unit, an identity authentication response message constructed by the road side unit, and verifying a signature; if the verification is failed, interrupting a request of the on-board unit to connect to the road side unit; and if the verification is successful, calculating, by the on-board unit, a session key and a hash value thereof, and constructing an acknowledgment message for transmitting to the road side unit;
   wherein
   the identity authentication response message is constructed by the road side unit according to the received identity authentication request message and after signature verification is successful;

the acknowledgment message is used in calculating a session key and a hash value thereof by the road side unit for contrast verification; if the hash value of the session key calculated by the road side unit is equal to the hash value of the session key calculated by the on-board unit, security authentication between the on-board unit and the road side unit is successful and a session key is generated; and if the two hash values are not equal, the security authentication between the on-board unit and the road side unit is failed;

a method of constructing, by an on-board unit, an identity authentication request message comprises:

generating, by the on-board unit, a temporary serial number SN and a random number $r_A$, encrypting the random number $r_A$ with a public key of the road side unit by using an SM2 public key encryption algorithm to obtain $E_{Pub_B}(r_A)$, signing a hash value $H(r_A)$ of the random number $r_A$ with a private key of the on-board unit by using an SM2 digital signature algorithm to obtain $S_{Pri_A}(H(r_A))$, and combining the temporary serial number SN, an identity identifier $ID_A$, the encrypted random number $E_{Pub_B}(r_A)$ and the signed hash value $S_{Pri_A}(H(r_A))$ into the identity authentication request message $M_{Req}$; the identity authentication request message is calculated by the following formula:

$$M_{Req} = \{SN\|ID_A\|E_{Pub_B}(r_A)\|S_{Pri_A}(H(r_A))\}$$

wherein ∥ represents a data connector; and a hash algorithm used in calculating the hash value $H(r_A)$ is an SM3 national cryptographic hash algorithm; and a method of the receiving, by the on-board unit, an identity authentication response message constructed by the road side unit, and verifying a signature comprises:

receiving, by the on-board unit, the identity authentication response message $M_{Rep}$ from the road side unit, acquiring an identity identifier $ID_B$ of the road side unit, decrypting the encrypted random number $E_{Pub_A}(r_B)$ with the private key of the on-board unit by using the SM2 public key encryption algorithm to obtain the random number $r_A$, and verifying the signed hash value $S_{Pri_B}$ is ($H(r_B)$) with the public key of the road side unit by using the SM2 digital signature algorithm.

2. The security authentication method for an on-board unit in IoV communication based on a national cryptographic algorithm according to claim 1, wherein a method of the calculating, by the on-board unit, a session key and a hash value thereof, and constructing an acknowledgment message comprises:

calculating, by the on-board unit, a session key $S_{ka}$ as an exclusive OR value of the random number $r_A$ and a random number $r_B$, calculating a hash value $H(S_{ka})$ of the session key $S_{ka}$, and combining a serial number SN+2, the identity identifier $ID_A$ and the hash value $H(S_{ka})$ of the session key into the acknowledgment message $M_{Ack}$; and the session key and the acknowledgment message are calculated by the following formulas:

$$S_{ka} = r_A \oplus r_B$$

$$M_{Ack} = SN + 2\|ID_A\|H(S_{ka})$$

wherein ⊕ represents an exclusive OR operation, ∥ and represents the data connector; and a hash algorithm used in calculating the hash value $H(S_{ka})$ is the SM3 national cryptographic hash algorithm.

3. The security authentication method for an on-board unit in IoV communication based on a national cryptographic algorithm according to claim 1, before the constructing, by an on-board unit, an identity authentication request message for transmitting to a road side unit, further comprising:

transmitting, by the on-board unit, a certificate request file to a certificate authority (CA), and receiving a digital certificate generated by the CA signing and issuing the certificate request file from the on-board unit, wherein the digital certificate comprises a public key of the on-board unit and the public key of the road side unit;

the digital certificate signed and issued by the CA to the on-board unit is a CA root certificate in an X.509 format; and information of the digital certificate comprises a version number, a serial number, a signature algorithm, an issuer, a validity period, a subject, a subject public key, a subject public key algorithm and a signature value.

4. An IoV on-board unit based on a national cryptographic algorithm, the on-board unit comprising a random number generating module, a certificate signing and issuing module, an identity authentication message constructing module and an authentication module, and implementing the security authentication method for an on-board unit in IoV communication based on a national cryptographic algorithm according to claim 1, wherein the random number generating module is configured to generate a private key by a random number generator in a security chip built in the on-board unit, wherein the private key is stored in a memory cell of the security chip and prohibited from being exported;

the certificate signing and issuing module is configured to transmit, by the on-board unit, a certificate request file to a certificate authority (CA), and receive a digital certificate generated by the CA signing and issuing the certificate request file from the on-board unit;

the identity authentication message constructing module is configured to construct and transmit an identity authentication request message to a road side unit; and the authentication module is configured to, after receiving an identity authentication response message from the road side unit, verify a signature with a public key of a digital certificate of the road side unit, and calculate a session key and a hash value thereof.

5. An IoV on-board unit based on a national cryptographic algorithm, the on-board unit comprising a random number generating module, a certificate signing and issuing module, an identity authentication message constructing module and an authentication module, and implementing the security authentication method for an on-board unit in IoV communication based on a national cryptographic algorithm according to claim 2, wherein the random number generating module is configured to generate a private key by a random number generator in a security chip built in the on-board unit, wherein the private key is stored in a memory cell of the security chip and prohibited from being exported;

the certificate signing and issuing module is configured to transmit, by the on-board unit, a certificate request file to a certificate authority (CA), and receive a digital certificate generated by the CA signing and issuing the certificate request file from the on-board unit;

the identity authentication message constructing module is configured to construct and transmit an identity authentication request message to a road side unit; and the authentication module is configured to, after receiving an identity authentication response message from the road side unit, verify a signature with a public key of a digital certificate of the road side unit, and calculate a session key and a hash value thereof.

6. An IoV on-board unit based on a national cryptographic algorithm, the on-board unit comprising a random number generating module, a certificate signing and issuing module, an identity authentication message constructing module and an authentication module, and implementing the security authentication method for an on-board unit in IoV communication based on a national cryptographic algorithm according to claim 3, wherein the random number generating module is configured to generate a private key by a random number generator in a security chip built in the on-board unit, wherein the private key is stored in a memory cell of the security chip and prohibited from being exported;

the certificate signing and issuing module is configured to transmit, by the on-board unit, a certificate request file to the CA, and receive a digital certificate generated by the CA signing and issuing the certificate request file from the on-board unit;

the identity authentication message constructing module is configured to construct and transmit an identity authentication request message to a road side unit; and the authentication module is configured to, after receiving an identity authentication response message from the road side unit, verify a signature with a public key of a digital certificate of the road side unit, and calculate a session key and a hash value thereof.

7. A security authentication method for a road side unit in IoV communication based on a national cryptographic algorithm, the method comprising:

receiving, by a road side unit, an identity authentication request message constructed by an on-board unit, and verifying a signature; if the verification is failed, interrupting a request of the on-board unit to connect to the road side unit; and if the verification is successful, constructing, by the road side unit, an identity authentication response message for transmitting to the on-board unit;

receiving, by the road side unit, an acknowledgment message constructed by the on-board unit, and calculating a session key and a hash value thereof for contrast verification with a session key and a hash value thereof calculated by the on-board unit, wherein if the hash value of the session key calculated by the road side unit is equal to the hash value of the session key calculated by the on-board unit, security authentication between the on-board unit and the road side unit is successful and a session key is generated; and if the two hash values are not equal, the security authentication between the on-board unit and the road side unit is failed;

the acknowledgment message is constructed by the on-board unit after receiving the identity authentication response message and succeeding in verifying the signature, and calculating the session key and the hash value thereof, and transmitted to the road side unit;

a method of the receiving, by a road side unit, an identity authentication request message constructed by an on-board unit, and verifying a signature comprises:

receiving, by the road side unit, the identity authentication request message $M_{Req}$ from the on-board unit, acquiring an identity identifier $ID_A$ of the on-board unit, decrypting an encrypted random number $E_{Pub_B}(r_A)$ with a private key of the road side unit by using an SM2 public key encryption algorithm to obtain a random number $r_A$, and verifying a signed hash value $S_{Pri_A}(H(r_A))$ with a public key of the on-board unit by using an SM2 digital signature algorithm;

a method of the constructing, by the road side unit, an identity authentication response message comprises:

generating, by the road side unit, a random number $r_B$, encrypting the random number $r_B$ with the public key of the on-board unit by using the SM2 public key encryption algorithm to obtain $E_{Pub_A}(r_B)$, signing a hash value $H(r_B)$ of the random number $r_B$ with the private key of the road side unit by using the SM2 digital signature algorithm to obtain $S_{Pri_B}(H(r_B))$, and combining a serial number SN+1, an identity identifier $ID_B$, the encrypted random number $E_{Pub_A}(r_B)$ and the signed hash value $S_{Pri_B}(H(r_B))$ into the identity authentication response message $M_{Rep}$; and the identity authentication response message is calculated by the following formula:

$$M_{Rep} = \{SN + 1 \| ID_B \| E_{Pub_A}(r_B) \| S_{Pri_B}(H(r_B))\}$$

wherein ∥ represents a data connector; and a hash algorithm used in calculating the hash value $H(r_B)$ is an SM3 national cryptographic hash algorithm.

8. The security authentication method for a road side unit in IoV communication based on a national cryptographic algorithm according to claim 7, wherein a method of the receiving, by the road side unit, an acknowledgment message, and calculating a session key and a hash value thereof for contrast verification comprises:

receiving, by the road side unit, the acknowledgment message $M_{Ack}$, acquiring a hash value $H(S_{ka})$ of a session key, meanwhile, calculating the session key $S_{kb}$ as an exclusive OR value of the random number $r_A$ and the random number $r_B$, and calculating a hash value $H(S_{kb})$ of the session key $S_{kb}$; and comparing $H(S_{kb})$ with $H(S_{ka})$, wherein if $H(S_{kb})$ is equal to $H(S_{ka})$, security authentication between the on-board unit and the road side unit is successful and a session key is generated: $S_k = S_{ka} = S_{kb}$; and if $H(S_{kb})$ is not equal to $H(S_{ka})$, the security authentication between the on-board unit and the road side unit is failed.

9. The security authentication method for a road side unit in IoV communication based on a national cryptographic algorithm according to claim 8, before the receiving, by a road side unit, an identity authentication request message constructed by an on-board unit, further comprising:

transmitting, by the road side unit, a certificate request file to a certificate authority (CA), and receiving a digital certificate generated by the CA signing and issuing the certificate request file from the road side unit, wherein the digital certificate comprises the public key of the on-board unit and a public key of the road side unit;

the digital certificate signed and issued by the CA to the road side unit is a CA root certificate in an X.509 format; and information of the digital certificate comprises a version number, a serial number, a signature algorithm, an issuer, a validity period, a subject, a subject public key, a subject public key algorithm and a signature value.

10. An IoV road side unit based on a national cryptographic algorithm, the road side unit comprising a random number generating module, a certificate signing and issuing module, an identity authentication message constructing module and an authentication module, and implementing the security authentication method for a road side unit in IoV communication based on a national cryptographic algorithm according to claim 7, wherein
the random number generating module is configured to generate a private key by a random number generator in a security chip built in the road side unit, wherein the private key is stored in a memory cell of the security chip and prohibited from being exported;
the certificate signing and issuing module is configured to transmit, by the road side unit, a certificate request file to a certificate authority (CA), and receive a digital certificate generated by the CA signing and issuing the certificate request file from the road side unit;
the identity authentication message constructing module is configured to construct and transmit an identity authentication response message to an on-board unit; and
the authentication module is configured to, after receiving an acknowledgment message constructed by the on-board unit, verify a signature with a public key of a digital certificate of the on-board unit, and verify a hash value of a session key, wherein if the verification of the signature or the hash value of the session key is failed, security authentication between the on-board unit and the road side unit is failed.

11. An IoV road side unit based on a national cryptographic algorithm, the road side unit comprising a random number generating module, a certificate signing and issuing module, an identity authentication message constructing module and an authentication module, and implementing the security authentication method for a road side unit in IoV communication based on a national cryptographic algorithm according to claim 8, wherein
the random number generating module is configured to generate a private key by a random number generator in a security chip built in the road side unit, wherein the private key is stored in a memory cell of the security chip and prohibited from being exported;
the certificate signing and issuing module is configured to transmit, by the road side unit, a certificate request file to a certificate authority (CA), and receive a digital certificate generated by the CA signing and issuing the certificate request file from the road side unit;
the identity authentication message constructing module is configured to construct and transmit an identity authentication response message to an on-board unit; and
the authentication module is configured to, after receiving an acknowledgment message constructed by the on-board unit, verify a signature with a public key of a digital certificate of the on-board unit, and verify a hash value of a session key, wherein if the verification of the signature or the hash value of the session key is failed, security authentication between the on-board unit and the road side unit is failed.

12. An IoV road side unit based on a national cryptographic algorithm, the road side unit comprising a random number generating module, a certificate signing and issuing module, an identity authentication message constructing module and an authentication module, and implementing the security authentication method for a road side unit in IoV communication based on a national cryptographic algorithm according to claim 9, wherein
the random number generating module is configured to generate a private key by a random number generator in a security chip built in the road side unit, wherein the private key is stored in a memory cell of the security chip and prohibited from being exported;
the certificate signing and issuing module is configured to transmit, by the road side unit, a certificate request file to the CA, and receive a digital certificate generated by the CA signing and issuing the certificate request file from the road side unit;
the identity authentication message constructing module is configured to construct and transmit an identity authentication response message to an on-board unit; and
the authentication module is configured to, after receiving an acknowledgment message constructed by the on-board unit, verify a signature with a public key of a digital certificate of the on-board unit, and verify a hash value of a session key, wherein if the verification of the signature or the hash value of the session key is failed, security authentication between the on-board unit and the road side unit is failed.

13. A security authentication system for IoV communication based on a national cryptographic algorithm, the system comprising:
an on-board unit, the road side unit according to claim 10, and the CA, wherein
the on-board unit comprising a random number generating module, a certificate signing and issuing module, an identity authentication message constructing module and an authentication module, and implementing a security authentication method for an on-board unit in IoV communication based on a national cryptographic algorithm, wherein
the random number generating module is configured to generate a private key by a random number generator in a security chip built in the on-board unit, wherein the private key is stored in a memory cell of the security chip and prohibited from being exported;
the certificate signing and issuing module is configured to transmit, by the on-board unit, a certificate request file to the CA, and receive a digital certificate generated by the CA signing and issuing the certificate request file from the on-board unit;
the identity authentication message constructing module is configured to construct and transmit an identity authentication request message to a road side unit; and
the authentication module is configured to, after receiving an identity authentication response message from the road side unit, verify a signature with a public key of a digital certificate of the road side unit, and calculate a session key and a hash value thereof;
the security authentication method for an on-board unit in IoV communication based on a national cryptographic algorithm comprising:
constructing, by an on-board unit, an identity authentication request message for transmitting to a road side unit;
receiving, by the on-board unit, an identity authentication response message constructed by the road side unit, and verifying a signature; if the verification is failed, interrupting a request of the on-board unit to connect to the road side unit; and if the verification is successful, calculating, by the on-board unit, a session key and a hash value thereof, and constructing an acknowledgment message for transmitting to the road side unit; wherein the identity authentication response message is constructed by the road side unit according to the received identity authentication request message and after signature verification is successful;

the acknowledgment message is used in calculating a session key and a hash value thereof by the road side unit for contrast verification; if the hash value of the session key calculated by the road side unit is equal to the hash value of the session key calculated by the on-board unit, security authentication between the on-board unit and the road side unit is successful and a session key is generated; and if the two hash values are not equal, the security authentication between the on-board unit and the road side unit is failed;

a method of constructing, by an on-board unit, an identity authentication request message comprises:

generating, by the on-board unit, a temporary serial number SN and a random number $r_A$, encrypting the random number $r_A$ with a public key of the road side unit by using an SM2 public key encryption algorithm to obtain $E_{Pub_B}(r_A)$, signing a hash value $H(r_A)$ of the random number $r_A$ with a private key of the on-board unit by using an SM2 digital signature algorithm to obtain $S_{Pri_A}(H(r_A))$, and combining the temporary serial number SN, an identity identifier $ID_A$, the encrypted random number $E_{Pub_B}(r_A)$ and the signed hash value $S_{Pri_A}(H(r_A))$ into the identity authentication request message $M_{Req}$; the identity authentication request message is calculated by the following formula:

$$M_{Req} = \{SN\|ID_A\|E_{Pub_B}(r_A)\|S_{Pri_A}(H(r_A))\}$$

wherein ∥ represents a data connector; and a hash algorithm used in calculating the hash value $H(r_A)$ is an SM3 national cryptographic hash algorithm; and a method of the receiving, by the on-board unit, an identity authentication response message constructed by the road side unit, and verifying a signature comprises:

receiving, by the on-board unit, the identity authentication response message $M_{Rep}$ from the road side unit, acquiring an identity identifier $ID_B$ of the road side unit, decrypting the encrypted random number $E_{Pub_A}(r_B)$ with the private key of the on-board unit by using the SM2 public key encryption algorithm to obtain the random number $r_A$, and verifying the signed hash value $S_{Pri_B}(H(r_B))$ with the public key of the road side unit by using the SM2 digital signature algorithm;

wherein the CA comprises a certificate signing and issuing module configured to generate a digital certificate by signing and issuing a certificate request file received from the on-board unit or the road side unit; the digital certificate comprises a public key of the on-board unit and a public key of the road side unit; the digital certificate is a CA root certificate in an X.509 format; and information of the digital certificate comprises a version number, a serial number, a signature algorithm, an issuer, a validity period, a subject, a subject public key, a subject public key algorithm and a signature value.

14. A security authentication device for IoV communication based on a national cryptographic algorithm, the device comprising a memory and a processor, wherein the memory stores a computer program for implementing a method for security authentication in IoV communication based on a national cryptographic algorithm, and the processor executes the computer program to implement steps of the method according to claim 1.

15. A security authentication device for IoV communication based on a national cryptographic algorithm, the device comprising a memory and a processor, wherein the memory stores a computer program for implementing a method for security authentication in IoV communication based on a national cryptographic algorithm, and the processor executes the computer program to implement steps of the method according to claim 2.

16. A security authentication device for IoV communication based on a national cryptographic algorithm, the device comprising a memory and a processor, wherein the memory stores a computer program for implementing a method for security authentication in IoV communication based on a national cryptographic algorithm, and the processor executes the computer program to implement steps of the method according to claim 3.

17. A security authentication device for IoV communication based on a national cryptographic algorithm, the device comprising a memory and a processor, wherein the memory stores a computer program for implementing a method for security authentication in IoV communication based on a national cryptographic algorithm, and the processor executes the computer program to implement steps of the method according to claim 7.

18. A security authentication device for IoV communication based on a national cryptographic algorithm, the device comprising a memory and a processor, wherein the memory stores a computer program for implementing a method for security authentication in IoV communication based on a national cryptographic algorithm, and the processor executes the computer program to implement steps of the method according to claim 8.

19. A security authentication device for IoV communication based on a national cryptographic algorithm, the device comprising a memory and a processor, wherein the memory stores a computer program for implementing a method for security authentication in IoV communication based on a national cryptographic algorithm, and the processor executes the computer program to implement steps of the method according to claim 9.

\* \* \* \* \*